United States Patent
Norsworthy et al.

(10) Patent No.: US 6,192,125 B1
(45) Date of Patent: Feb. 20, 2001

(54) OPTICAL COUPLING CIRCUIT FOR A DATA ACCESS ARRANGEMENT (DAA)

(75) Inventors: John Norsworthy, Lucas; Darin Kincaid, Coppell, both of TX (US)

(73) Assignee: Texas Instruments Incorporated, Dallas, TX (US)

( * ) Notice: Under 35 U.S.C. 154(b), the term of this patent shall be extended for 0 days.

(21) Appl. No.: 09/108,576

(22) Filed: Jul. 1, 1998

(51) Int. Cl.[7] .............................. H04M 1/00; H04M 11/00
(52) U.S. Cl. ........................ 379/399; 379/379; 379/93.05
(58) Field of Search .................................. 379/379, 377, 379/382, 386, 387, 399, 402, 412, 414, 418, 93.05–93.07, 93.37

(56) References Cited

U.S. PATENT DOCUMENTS 5,245,654 * 9/1993 Wilkison et al. ..................... 379/379
5,946,394 * 8/1999 Gambuzza ........................... 379/399

* cited by examiner

Primary Examiner—Wing F. Chan
(74) Attorney, Agent, or Firm—Mark E. Courtney; W. James Brady; Frederick J. Telecky, Jr.

(57) ABSTRACT

There is disclosed a system and method of providing electrical isolation between a telephone line and a connected device, such as a computer. In one embodiment the telephone line is 2-wire and the connected device is 4-wire and includes a feedback elimination circuit. A pair of controlled CTR opto diodes are used in the communication path to effect electrical isolation. The opto diodes are used in conjunction with an electronic inductor constructed using a pair of cascoded darlington transistors to control the telephone line voltage and current and the circuit is designed to maintain the optocouplers within their linear operating range.

45 Claims, 3 Drawing Sheets

OPTICAL COUPLING CIRCUIT FOR A DATA ACCESS ARRANGEMENT (DAA)

REFERENCE TO RELATED APPLICATIONS

The present application is being concurrently filed with commonly assigned, U.S. patent application entitled ELECTRONICALLY SWITCHED OPTICALLY COUPLED LINE INTERFACE, the disclosure of which is incorporated herein by reference.

TECHNICAL FIELD OF THE INVENTION

This invention relates to a circuit for providing communication between one computer and another via the public switched telephone network while simultaneously providing a high degree of electrical isolation therein between.

BACKGROUND OF THE INVENTION

In telephone systems there is a requirement that devices, such as modems, which are coupled to telephone lines must provide isolation between the device and the central office. Typically, prior art systems provide isolation by using a transformer between the telephone line and the device. The telephone line is usually connected to the primary side of the transformer and the device is on the secondary side. Signals from the transmission line and from the device are coupled across the transformer so that current does not flow directly from the device to the central office.

Instead of using a transformer to couple a device to a transmission line, some prior art systems use optically coupled circuits to provide the required isolation. This type of system is disclosed in U.S. Pat. Nos. 4,190,747 and 4,228,323, both to Feiner et al and in co-pending Patent application Ser. No. 08/957,916, assigned to a common assignee, the disclosures of which are hereby incorporated by reference. Optically coupled systems use photo emitters and photo detectors to couple the two sides of the circuit using light waves.

However transformers have disadvantages due to their physical size as well as their cost. Optocouplers are used for PC/MCIA applications where size constraints are severe. However, these circuits are very complicated and costly since they require feedback circuits to cancel errors due to component variation, especially the current transfer ratio (CTR) of the optocoupler. CTR, is the ratio of induced photo current in a photo-transistor to the forward current of an LED.

The circuit must provide a load to the telephone network consistent with certain requirements. These requirements are usually in the form of a permissible DC voltage and current. Additionally, the AC input impedance is specified as well, which typically is 600 Ohms in the U.S.

The electrical isolation provided by the circuit accomplishes two objectives: 1) isolates the common voltage or ground of the telephone line from that of the computer's allowing them to be substantially different and helps isolate; 2) voltage surges which may be present on the telephone line which could prove to be destructive to sensitive integrated circuits within the computer.

A final requirement for the circuit is that it performs a 4-wire to 2-wire conversion. From the figure, the "4 wires" are the receive signal (Rx) and its reference (typically the computer system's ground) and the transmit signal (Tx) and its reference. The "2 wires" are the tip and ring, which carry the standard signals which telephones and modems use.

SUMMARY OF THE INVENTION

These and other objects, features and technical advantages are achieved by a circuit which uses optocouplers that are manufactured in such a way as to guarantee the CTR of the device over a controlled range, while still costing little more than a standard optocoupler. Thus, by employing these devices, a minimal circuit involving only two optocouplers can be used which yields minimum cost.

The major blocks of the circuit are the electronic inductor, the receive optocoupler and its associated biasing circuitry, the transmit optocoupler and its associated biasing circuitry, and the transmit canceller, which is often referred to in the industry as a near-end echo canceller. A central concept of the overall circuit is to take advantage of the availability of optocouplers with controlled current transfer ratios, thus eliminating the need for expensive feedback circuits. By using such controlled transfer ratio optocouplers, a DAA circuit is designed to produce a linear response over the entire range of operation. Since feedback is not required, the minimum number of optocouplers can be employed to meet the requirements of the DAA circuit.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
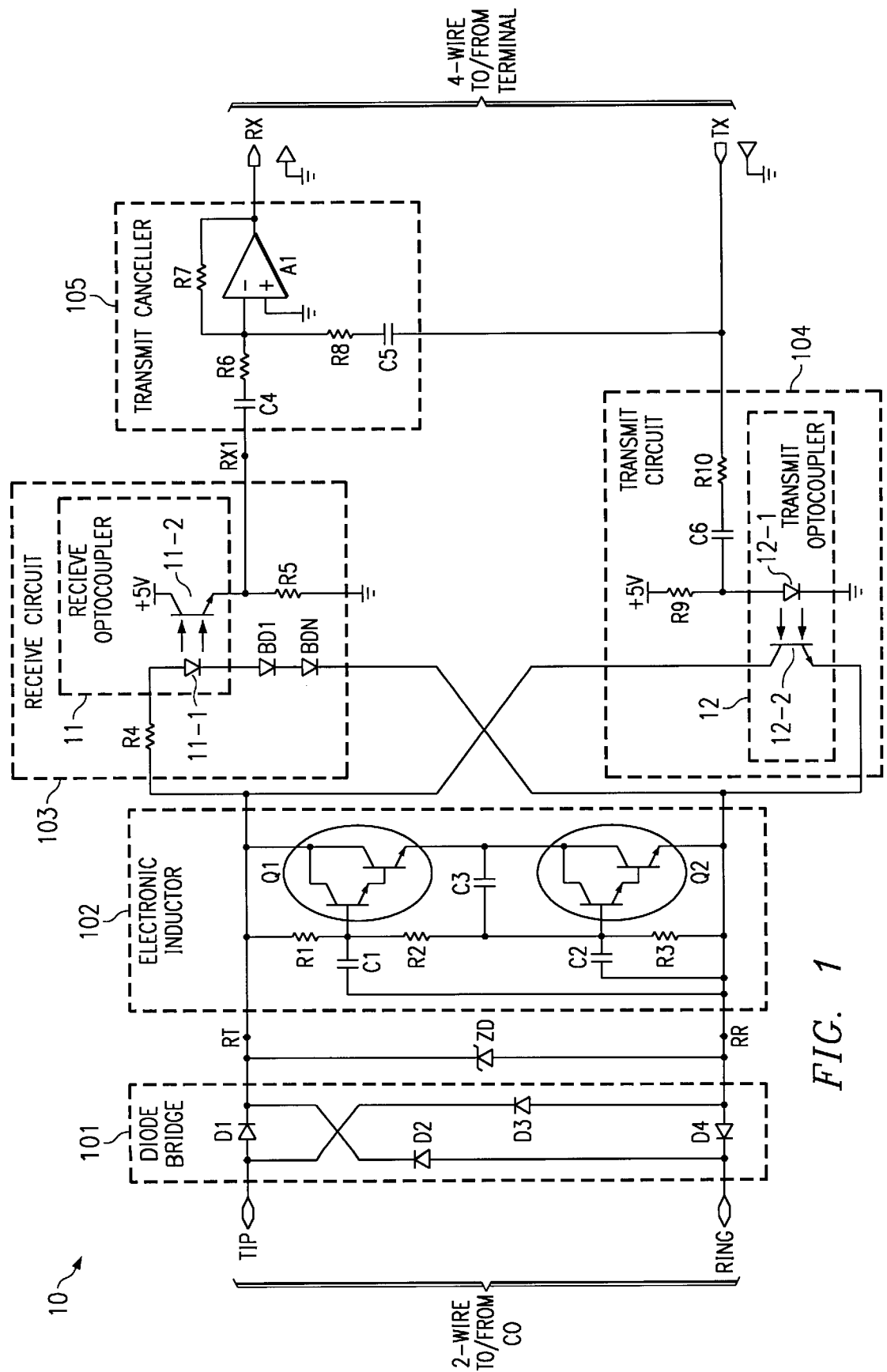
FIG. 1 is a diagram of a system incorporating the present invention.
Figure 2:
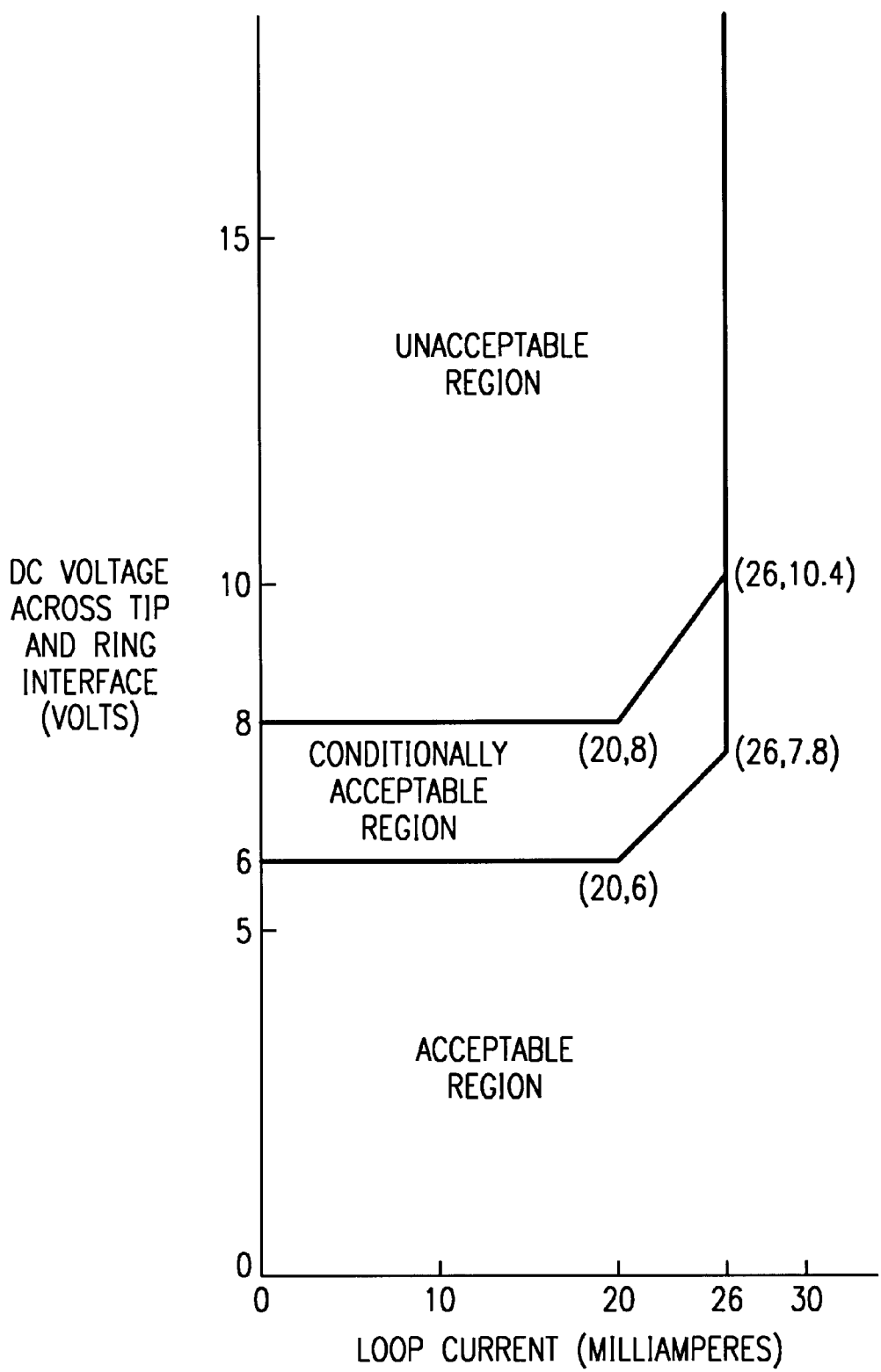
FIG. 2 is a diagram showing typical DC input characteristics.

As shown in FIG. 1, the purpose of the Electronic Inductor (EI) is to absorb the excess DC loop current presented by the telephone line while passing nearly all of the AC signal to the coupling circuit. In the present circuit, additional requirements are placed on electronic inductor 102 when compared to those used in transformer-based Data Access Arrangements (DAAs). For our circuit, electronic inductor 102 must bias LED (Light Emitting Diode) 11-1 of receive optocoupler 11 and photo-transistor 12-2 of transmit optocoupler 12 over the range of conditions provided by the telephone line. This range of operation is defined by the loop current, which can vary from approximately 20 to 100 mA. Additionally, the DC input characteristics must operate within FCC guidelines as shown in FIG. 2. A further requirement on the electronic inductor is to provide a very high AC impedance, such that the maximum signal level is transferred to the receive optocoupler. The EI resides in the circuit after diode bridge 101 and zener diode ZD which clamps the voltage to a maximum level and is used to prevent severe over voltage conditions.

The EI circuit behaves inductively in that it presents a very low impedance to DC voltage but a very high impedance to AC signals, especially those in the band of interest. Thus, in the band of interest, nearly all of the signal energy is passed, typically 300 hz to 4000 hz, to receive circuit 103.

As shown in FIG. 1, EI 102 uses two darlington transistors Q1 and Q2 arranged in cascode fashion. A cascode circuit is used to obtain very high impedance between nodes RT and RR, which allows most of the signal energy to pass to LED 11-1 of opto 11. Darlington transistors are used because they have very high betas (the ratio of collector current to base current), and consequently less base current and resulting in a smaller voltage drop across biasing resistors R1 and R2. Of course, other transistor arrangements, including single transistors or other active devices, could be used to achieve proper voltage regulation. Three resistors, R1, R2 and R3 are used to bias the EI 102. If the base currents of the transistors are negligible, then the voltage between RT and RR is computed as follows. The voltage across R3 is the base-emitter forward voltage of Q2, approximately 1.5V. This voltage sets the current in R3, as well as the current in R1 and R2. If the current in R3 is 1.5V/R3, then the voltage between RT and RR is (1.5V/R3)*(R1+R2)+1.5. Clearly, values of R1, R2 and R3 can be defined so that the voltage across EI 102 is approximately 5V.

Capacitors C1 and C2 are used to create the inductive effect by providing a shunt for AC signals. Thus, the voltage at the base of Q2, which sets the current of the EI, is sensitive only to changes in DC voltage between RT and RR. The values of C1 and C2 are set so that in the AC signals in the band of interest are completely shunted. Capacitor C3 reduces low frequency resonance of EI 102 by reducing the gain of Q2 at the point of resonance. C3 may not be required in all applications.

The receive circuit consists of opto 11, R4, biasing diodes BD1, BDn, and R5. While it is possible to configure a functional circuit without biasing diodes BD1, BDn and R5, optimum performance and greater design freedom are released through their deploy. The DC forward current is set by R4 and the biasing diodes. R4 is set to a value such that the overall input impedance of the circuit is 600 Ohms (for U.S.), typically around 700 Ohms because of finite output impedance of opto-112 and EI 102. The forward current, (IF) is multiplied in photo-transistor 11-2 by its CTR. Maximum linearity is achieved when the emitter of opto 11 is approximately 2.5V. This is achieved by setting R5 such that CTR*$I_f$*R5=2.5. $I_f$ is defined by the voltage across EI 102 and R4 and the biasing diodes. Biasing diodes are necessary since R4 must be set to about 700 Ohms to meet input impedance requirements. Thus, $I_f$=(VEI−VD1−VD2 . . . )/R4, where VDn is the forward drop across a diode, typically 0.7V. One or more biasing diodes are used in series depending on how much voltage is desired across R4.

The transmit circuit consists of opto 12, R9, C6 and R10. The circuit is biased by R9, which sets the DC forward current of opto 11 LED 12-1, and thus the quiescent collector current of opto 12's photo-transistor 12-2. Capacitor C6 provides DC isolation of the LED from the signal source, Tx such that the input impedance seen by Tx is R10.

Since the transmit circuit uses opto 12 in a common emitter configuration, the signal is inverted in passing from Tx to the telephone line. This is used to create a transmit cancellation circuit 105. The purpose of the transmit canceller 105 is to subtract the signal Tx from the signal received at Rx so that the signal input of Tx is not received back at Rx which could yield an objectionable echo back to the terminal. This subtraction could, if desired, be performed in software on a digital signal processor or microprocessor within the DC. Thus the invention does not require a hardware transmit canceller, however a simple means is shown here for completeness.

Transmit cancellation circuit 105 consists of op-amp A1 connected as a summing amplifier. Capacitors C4 and C5 serve to provide DC isolation. The function the circuit performs is to add the voltages Rx1 and Tx. The textbook equation for the summation is: Rx=(R7/R6)*Rx1+(R7/R8)*Tx. Note that Rx1 contains the signal to be received from, TIP/RING plus an inverted form of Tx such that if some factor of Tx is added to this signal, Tx will effectively be canceled. Thus R8 is set to be a value to provide the factor of Tx to achieve this cancellation.

FIG. 2 characterizes the voltage versus current limits of the telephone set, as measured at the tip and ring interface while the telephone set is disassociated from the central office or PBX line. On simulated outgoing calls operation is within the Acceptable Region during the On-Hook to Off-Hook transition and during the make interval of rotary dial pulsing. On simulated outgoing calls operation is within the Conditionally Acceptable Region during DTMF signaling and after called party answer. On simulated incoming calls, operation is within the Acceptable Region for at least one second after answer; and after one second operation is allowed to be in the Conditionally Acceptable Region for the remainder of the call.

Figure 3:
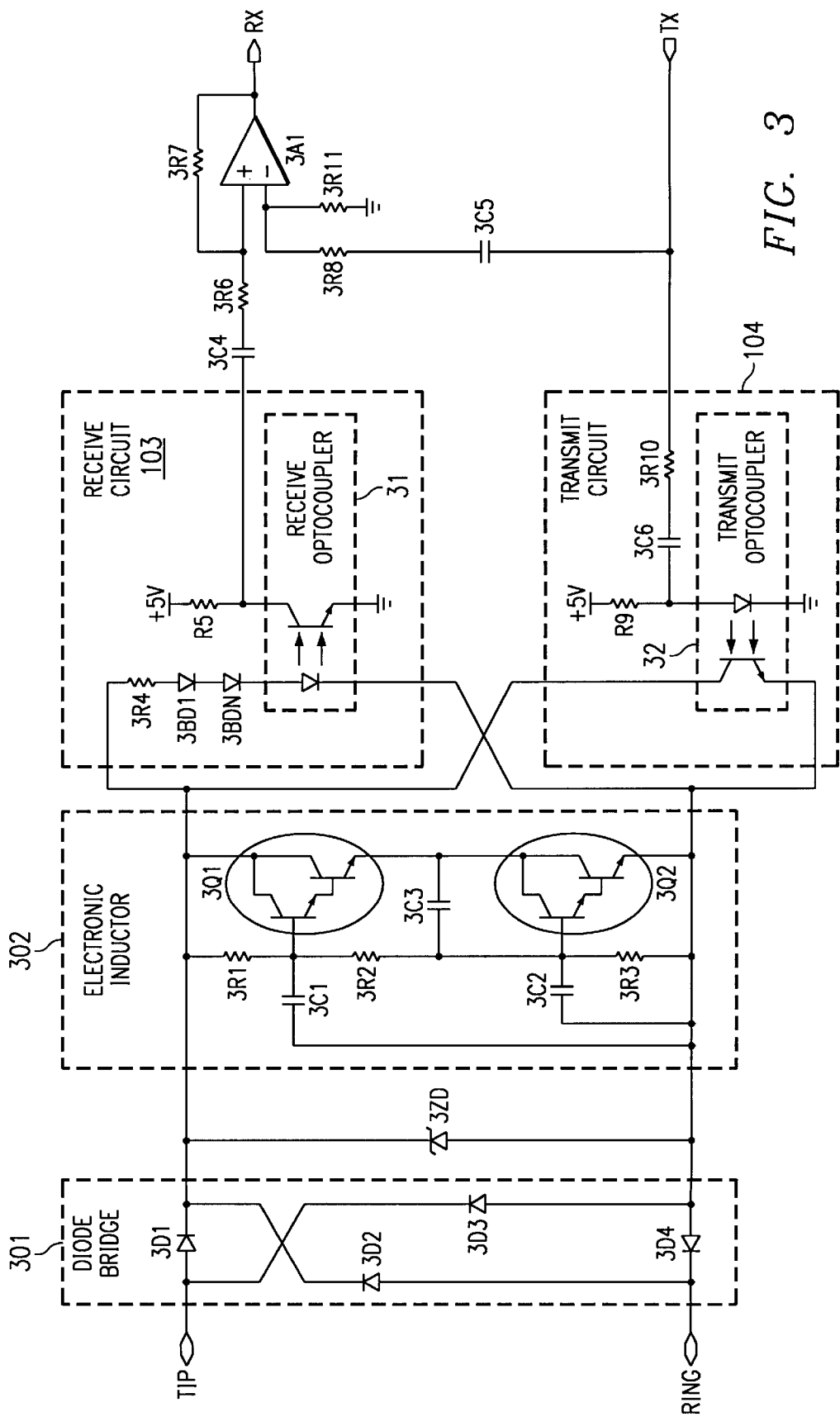
FIG. 3 is one alternate arrangement of the optocoupler.

FIG. 3 shows an alternate arrangement for the receive circuit. In this topology, the receive opto-coupler is configured with its photo-transistor in a common emitter fashion, as compared to the emitter follower configuration of FIG. 1. In either configuration, the signal level of the output is determined by load resistor R5 and the input impedance setting resistor R4. This is because the current in the photo transistor in either configuration is equal to the current in R4 times the CTR of the opto-coupler. The difference between the two configurations is that for the common emitter case, there is a signal inversion, while in the emitter follower case there is not.

In the preferred embodiment as shown in FIG. 1, opto-couplers 11 and 12 have controlled CTRs and could be CNY 17-3, available from Motorola and others, and diodes BD1 to BDN are 1N4004 and Q1 and Q2 are advantageously darlington transistors MPS 13. It is important for manufacturing purposes that the optocoupler's CTR is controlled within a range of 100%–200% or higher. This circuit should be designed so that linear operation is achieved in a manner that is compatible with the range of the CTR of the opto-couplers. It should be noted that while a specific type of optocoupler is shown and described, the circuit could work with many different devices providing they are linearly coupled and electrically isolated from input to output.

Although the present invention and its advantages have been described in detail, it should be understood that various changes, substitutions and alterations can be made herein without departing from the spirit and scope of the invention as defined by the appended claims.

What is claimed is:

1. A telephone line interface for interfacing between a telephone line and a device, said interface comprising:

an input connectable to said telephone line;

an output connectable to said device;

a circuit having first and second connections connected across said input for terminating the telephone line voltage and current;

first and second optocouplers each connected across said circuit; said first optocoupler having one side of its input connected to said first connection of said circuit to control the impedance presented by said line circuit to said telephone line via said connected input and the other side of its input connected to said second connection of said circuit, said second optocoupler having one side of its output connected to said first connection of said circuit and the other side of its output connected to said second connection of said circuit;

wherein an output of said first optocoupler is connected to a receive portion of said output and wherein the input of said second optocoupler is connected to a transmit portion of said output.

2. The interface of claim 1 further comprising:

means connected between said output of said first optocoupler and said receive portion of said optocoupler for removing from said output those signals which have been received by said line circuit via said transmit portion of said optocoupler.

3. The interface of claim 2 wherein said removing means includes an op amp.

4. The interface of claim 1 wherein at least one of said optocouplers has a controlled CTR.

5. The interface of claim 1 wherein said circuit includes an electronic inductor.

6. The interface of claim 5 wherein said EI operates as an inductor as well as a voltage regulator.

7. The interface of claim 5 wherein said EI includes two sets of darlington connected transistors.

8. The interface of claim 5 wherein said EI includes a high beta transistor circuit.

9. The interface of claim 1 wherein said circuit includes a pair of darlington transistors arranged in a cascode circuit and connected across said first and second connections.

10. The interface of claim 1 wherein said connection of said input connection to said first optocoupler includes a series passive impedance and wherein said passive impedance is selected to set the input impedance of the circuit.

11. The interface of claim 10 wherein said second connection from said input to said second connection includes at least one biasing diode.

12. The interface of claim 10 wherein said series passive impedance is a resistor in the range of 400–2000 ohms.

13. The interface of claim 1 further including means for biasing said first and second optocouplers for linear performance.

14. The interface of claim 1 wherein the photo transistor of said first optocoupler is arranged in an emitter follower configuration.

15. The interface of claim 1 wherein the photo transistor of said first optocoupler is arranged in a common emitter configuration.

16. The interface of claim 1 wherein the input of said second optocoupler is connected to said device connectable output through a series RL circuit.

17. The interface of claim 1 further including a diode bridge connected across said circuit.

18. The interface of claim 5 wherein said EI includes cascode connected transistors with their bases connected to an AC common node.

19. The interface of claim 17 where said AC common connector includes at least one capacitor.

20. The interface of claim 5 where said EI includes a stabilizing circuit operable at low frequency.

21. The interface of claim 20 wherein said stabilizing circuit includes at least one capacitor.

22. The interface of claim 5 wherein said EI includes a set of darlington pair transistors connected in cascode fashion with their bases connected to AC common and wherein the base of one darlington transistor is connected to its collector through a capacitor.

23. The interface of claim 5 wherein said EI includes voltage regulation controlled by a set of resistors.

24. The interface of claim 1 wherein said circuit includes a zener diode connected across said input.

25. The method of interfacing between a telephone line and a device, said method comprising the steps of:

receiving a communication signal over said telephone line and presenting said received signal to a circuit having first and second connections connected across said telephone line, said circuit including first and second optocouplers each connected across said circuit; said first optocoupler having one side of its input connected to said connection of said circuit to control the impedance presented by said circuit to said telephone line via said connected input and the other side of its input connected to said second connection of said circuit, said second optocoupler having one side of its output connected to said first connection of said circuit and the other side of its output connected to said second connection of said circuit;

wherein an output of said first optocoupler is connected to a receive portion of said output and wherein the input of said second optocoupler is connected to a transmit portion of said output; and bidirectionally presenting telephone line signals to and from said device through said optocouplers to achieve electrical isolation between said telephone line and said device.

26. The method of claim 25 further comprising the step of:

removing from said output those signals which have been received by said line circuit from said device.

27. The method of claim 25 wherein said bidirectionally presenting step includes the step of presenting of said signals across a pair of darlington transistors arranged in a cascode circuit, said cascode circuit connected across said first and second connections.

28. The method of claim 27 wherein said cascode circuit is included within an electronic inductor.

29. The method of interfacing communication signals between a telephone line and a communication device, said method including the steps of:

terminating said telephone line across an electronic inductor which presents a low impedance to DC voltage and a high impedance to AC signals, said electronic inductor providing a regulated biasing voltage to both transmit and receive optocoupler circuits;

presenting signals received from said telephone line to the LED portion of said receive optocoupler; and presenting signals from said communication device to the LED portion of said transmit optocoupler.

30. The method of claim 29 wherein said presenting steps each include the step of presenting said signals through a series impedance.

31. The method of claim 29 further including the steps of:

presenting signals from the photodetector of said receive optocoupler to said communication device; and presenting signals from the photodetector of said transmit optocoupler to said telephone line.

32. The method of claim 30 further including the steps of:

combining signals presented from said communication device with signals presented from said telephone line; and removing from said combined signals the portion of said combined signal presented from said communication device.

33. An interface circuit for connection between a telephone line and a communication device, said circuit comprising:

an electronic inductor for terminating said telephone line, said electronic inductor operable for presenting a low impedance to DC voltage and a high impedance to AC signals, said electronic inductor providing a regulated biasing voltage to both transmit and receive optocoupler circuits;

means for presenting signals received from said telephone line to the LED portion of said receive optocoupler; and means for presenting signals received from said communication device to the LED portion of said transmit optocoupler.

34. The circuit of claim 33 wherein each said presenting means includes means for presenting said signals through a series impedance.

35. The circuit of claim 33 further including:

means for presenting signals from the photodetector of said receive optocoupler to said communication device; and means for presenting signals from the photodetector of said transmit optocoupler to said telephone line.

36. The circuit claim 35 further including:

means for combining signals presented from said communication device with signals presented from said telephone line; and means for removing from said combined signals the portion of said combined signal presented from said communication device.

37. The circuit of claim 33 wherein said electronic inductor includes at least one high beta transistor.

38. The circuit of claim 33 wherein said electronic inductor includes two sets of darlington connected transistors.

39. The circuit of claim 38 wherein said EI includes cascode connected transistors with their bases connected to an AC common node.

40. The circuit of claim 38 wherein said AC common connector includes at least one capacitor.

41. The circuit of claim 39 where said EI includes a stabilizing circuit operable at low frequency.

42. The circuit of claim 41 where said stabilizing circuit include at last one capacitor.

43. The circuit of claim 38 wherein said EI includes a set of darlington pair transistor connected in cascode fashion with their basis connected to AC common and wherein the base of one darlington transistor is connected to its collector through a capacitor.

44. The circuit of claim 38 wherein said EI includes voltage regulation controlled by a set of resistors.

45. The circuit of claim 33 wherein said circuit includes a zener diode connected across said input.

* * * * *